(12) United States Patent
Chrisop et al.

(10) Patent No.: US 8,120,802 B2
(45) Date of Patent: Feb. 21, 2012

(54) SYSTEM AND METHOD FOR SECURELY ACCESSING DOWNLOADED PRINT JOB RESOURCES

(75) Inventors: Roy K. Chrisop, Camas, WA (US); Lena Sojian, Fountain Valley, CA (US); Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1121 days.

(21) Appl. No.: 11/634,665

(22) Filed: Dec. 6, 2006

(65) Prior Publication Data

US 2008/0137121 A1     Jun. 12, 2008

(51) Int. Cl.
*G06F 3/12*     (2006.01)
*G06K 15/00*   (2006.01)
*G06F 15/16*   (2006.01)

(52) U.S. Cl. ............ 358/1.15; 358/1.13; 358/1.14; 358/1.16; 358/1.17; 358/1.18; 726/3

(58) Field of Classification Search ........ 358/1.11–1.18; 726/3, 10; 717/178; 705/56; 709/203, 213; 713/165; 707/9
See application file for complete search history.

(56) References Cited

U.S. PATENT DOCUMENTS

| | | | |
|---|---|---|---|
| 5,239,621 A | 8/1993 | Brown, III et al. | 358/1.16 |
| 5,563,946 A * | 10/1996 | Cooper et al. | 705/56 |
| 5,598,470 A * | 1/1997 | Cooper et al. | 713/165 |
| 5,720,012 A | 2/1998 | McVeigh et al. | 358/1.14 |
| 5,993,088 A | 11/1999 | Nogay et al. | 400/78 |
| 6,202,092 B1 | 3/2001 | Takimoto | 709/225 |
| 6,268,927 B1 | 7/2001 | Lo et al. | 358/1.15 |
| 6,732,278 B2 | 5/2004 | Baird, III et al. | 726/7 |
| 6,889,202 B2 * | 5/2005 | Johnson et al. | 705/26 |
| 6,990,513 B2 * | 1/2006 | Belfiore et al. | 709/203 |
| 6,999,188 B1 * | 2/2006 | Ashe | 358/1.15 |
| 7,260,622 B2 * | 8/2007 | Goodwin et al. | 709/223 |
| 7,630,091 B2 * | 12/2009 | Ikeno | 358/1.13 |
| 2002/0091693 A1 * | 7/2002 | Ueda | 707/9 |
| 2002/0144257 A1 * | 10/2002 | Matsushima | 717/178 |
| 2004/0044953 A1 | 3/2004 | Watkins et al. | 715/500 |
| 2004/0057075 A1 | 3/2004 | Stewart et al. | 358/1.15 |
| 2005/0246415 A1 * | 11/2005 | Belfiore et al. | 709/203 |
| 2005/0275852 A1 * | 12/2005 | Ferlitsch | 358/1.6 |
| 2005/0275861 A1 * | 12/2005 | Ferlitsch | 358/1.13 |

(Continued)

FOREIGN PATENT DOCUMENTS

JP     6175794     6/1994

(Continued)

*Primary Examiner* — Mark K Zimmerman
*Assistant Examiner* — Satwant Singh
(74) *Attorney, Agent, or Firm* — Law Office of Gerald Maliszewski; Gerald Maliszewski

(57) ABSTRACT

A system and method are provided for securely accessing imaging job resources in a printing device. The method initially downloads a restricted software resource to a printing device. That is, the resource is restricted to use by a user group. As differentiated from factory installed software, or field upgrades, the restricted software resource is stored in a user-accessible memory, such as non-volatile storage (e.g., RAM). Subsequently, an imaging job is accepted for processing. The imaging job is verified to be associated with the user group. Subsequent to verification, access is permitted to the restricted software resource, and the imagining job is processed using the restricted software resource.

27 Claims, 11 Drawing Sheets

U.S. PATENT DOCUMENTS

| | | | |
|---|---|---|---|
| 2006/0230124 A1* | 10/2006 | Belfiore et al. | 709/219 |
| 2007/0101420 A1* | 5/2007 | Masui | 726/10 |
| 2007/0136787 A1* | 6/2007 | Chen et al. | 726/3 |
| 2009/0249435 A1* | 10/2009 | Madathilparambil George et al. | 726/1 |
| 2009/0260050 A1* | 10/2009 | George et al. | 726/1 |
| 2009/0328155 A1* | 12/2009 | Madathilparamgil George et al. | 726/1 |

FOREIGN PATENT DOCUMENTS

| | | |
|---|---|---|
| JP | 6250803 | 9/1994 |
| JP | 8020150 | 1/1996 |
| JP | 8314648 | 11/1996 |
| JP | 2004-109526 | 4/2004 |
| JP | 2005-001226 | 1/2005 |

* cited by examiner

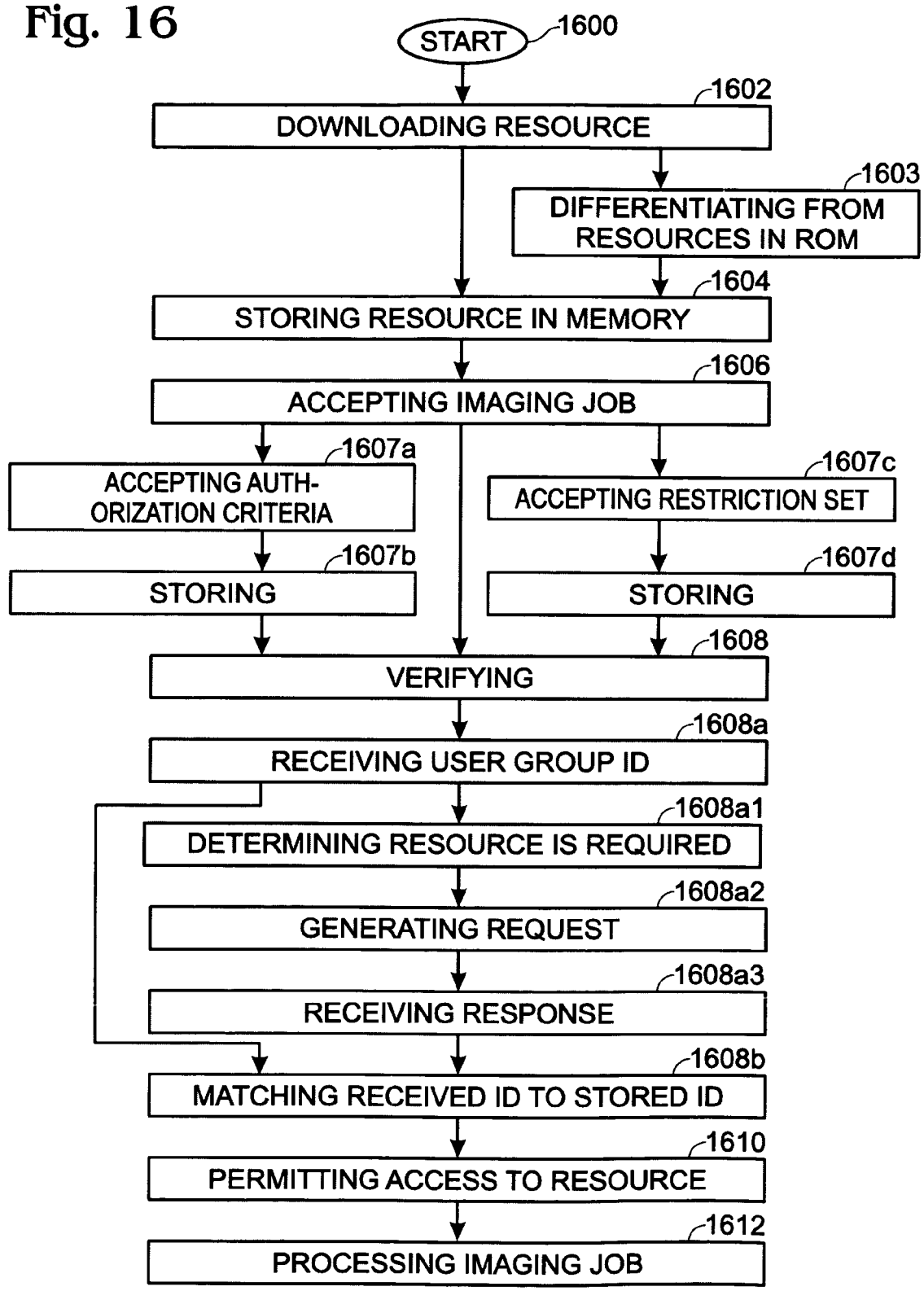

SYSTEM AND METHOD FOR SECURELY ACCESSING DOWNLOADED PRINT JOB RESOURCES

BACKGROUND OF THE INVENTION

1. Field of the Invention

This invention generally relates to digital image processing and, more particularly, to a system and method for a printer device to securely access downloaded print job resources.

2. Description of the Related Art

Many conventional multifunctional peripheral (MFP) or printing devices support a user download of reusable software resources, such as fonts, forms, watermarks, logos, digital signatures, and the like. This download allows users to generate print jobs, which use these resources, without repetitively downloading the resource(s) each time a job is generated. Once loaded in the device, however, the resources are available for general unrestricted use to all users, which may be undesirable in some circumstances.

It would be advantageous if software resources could be downloaded to a printing device and maintained in storage for future use by a selected group of users with authorized access to the downloaded resources.

SUMMARY OF THE INVENTION

The present invention describes a method for a user to download a private reusable resource, and restrict the subsequent use of the resource. The exemplary operating environment consists of one or more printing devices, and one or more host computing devices, communicatively-coupled to the printing devices. Additionally, users can download resources (e.g., fonts, forms, etc) from one or more of the connected hosts to the connected printers. Finally, users can then despool print jobs to the printer that requires the use of the downloaded resources.

In this invention, a downloaded resource can be assigned an access right, such as restricting access (or number of times) to the resource, to one or more users. When a resource is associated with a restricted access right, a print job requiring the resource must have authentication information (e.g., user/password or PIN) associated with the print job. The access rights associated with the authenticated user must grant access to the resource. If the print job does not have authentication information, or is not authenticated to use the resource, the print job can be rejected.

Accordingly, a method is provided for securely accessing imaging job resources in a printing device. The method initially downloads a restricted software resource to a printing device. That is, the resource is restricted for use by a user group. As differentiated from factory installed software, or field upgrades, the restricted software resource is stored in a user-accessible memory, such as a non-volatile storage (e.g. random access memory—RAM). Subsequently, an imaging job is accepted for processing. The imaging job is verified to be associated with the user group. Subsequent to verification, access is permitted to the restricted software resource, and the imagining job is processed using the restricted software resource.

Typically, the imaging job is a print job in a format such as a page description language (PDL). The restricted software resource may be resources such as forms, fonts, macros, logos, watermarks, address books, halftone patterns, color profiles, cover sheets, calibration data, digital signatures, biometric information, audio/video clips, and dictionaries.

In one aspect of the method, a user group identification is received simultaneously with accepting the imaging job for processing. Alternately, the imaging job is received (without a user group ID), and a determination is made that the restricted software resource is required for processing. Then, a user group identification request is generated, and the user group identification is received in response to the request.

Additional details of the above-described method, and a printing device system for securely accessing downloaded resources are provided below.

BRIEF DESCRIPTION OF THE DRAWINGS

FIG. 16 is a flowchart illustrating a method for securely accessing imaging job resources in a printing device.

DETAILED DESCRIPTION

A printing device may be part of a larger overall system that includes the printing device, as well a client device, such as a personal computer (PC), which may send a print job to the printing device for processing, via a local or network connection. The network may be a LAN, WAN, or Internet, for example. The printers and clients may be communicatively-coupled through a wired, wireless, or combination of connections. A local connection may be enabled with a USB, serial, or parallel port interface, for example.

Figure 7:
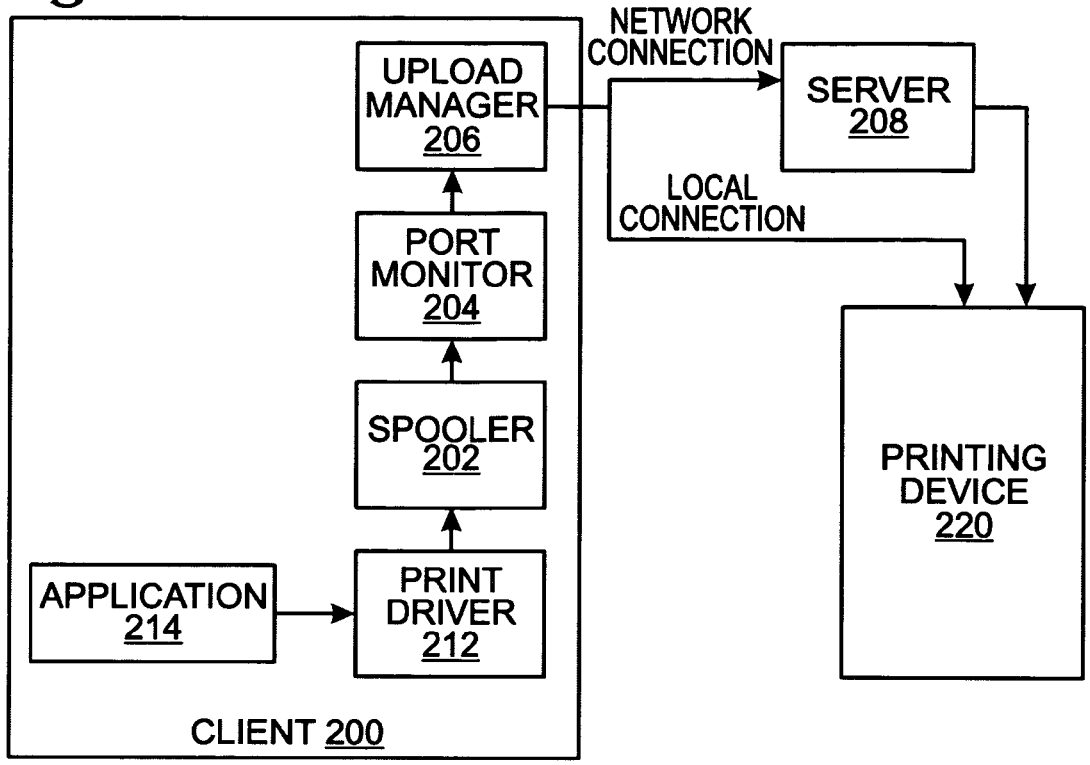
FIG. 7 is a schematic block diagram of a printing device system.

FIG. 7 is a schematic block diagram of a printing device system. In a client 200, relevant file information (parameters) is sent from the spooler 202 via the port monitor 204 and upload manager 206 to a network server 208 (e.g. a web server or print server). The relevant file information includes, for example, the location of the printer, printer name, job ID, printing level, and document information such as color, stapling, etc. After the relevant file information is sent to the port monitor 204, a check is performed to determine whether a valid component (e.g. a print driver 212) is being used, for example, to print the document. The print driver resides as a file on the client. However, in other aspects not shown, the print driver may be embedded in a network server or with the printing device. If, the print driver is valid, then the data file is sent from the print spooler 202 to the port monitor 204. The data file is sent, for example, as packets of information. Once the entire data file has been sent to the port monitor 204, the entire data file is sent, via the upload manager 206, to the server 208, and stored.

The client 200 may be a terminal, personal computer, PDA, mobile phone, etc. The application 214 may be a locally installed version of Microsoft Word™ or PowerPoint™, for example, or any other software capable of generating documents for printing. The local application 214 creates or downloads a document for transmission to the printing device. As used herein, a "document" is any data or information that is transmitted to a printed device, and which can become printed upon a physical medium, such as paper. The print driver 212 builds and creates objects necessary to communicate with the selected printing device, which may be locally or network connected. The upload manager 206 is responsible for compressing and transferring files (e.g., documents) over the network. The upload manager 206 may also encrypt the files. The upload manager may, for example, transfer and compress PostScript print files via a Secure Socket Layer (SSL). Once sent to the server 208, the document can be sent to the printer device 220. Alternately, the job can be sent via a local connection.

Many computing device platforms and printing systems are available today and embodiments of the present invention may be implemented with many of these systems. However, due to the prevalence of the Microsoft Windows® operating system family, aspects used in conjunction with Windows® systems are typically used to illustrate the invention. Accordingly, details of Microsoft Windows® printing processes are explained below.

Microsoft Windows® operating systems typically employ two file types in the printing process. These file types are Enhanced Metafile (EMF) and raw format (raw) files. Raw format files are device dependent files, which are destined and formatted for a specific device. An example of a raw file is an encapsulated Postscript (PS) file that is formatted for interpretation by a Postscript printer. EMF files are device independent files that contain graphic device interface (GDI) function calls that reproduce an application's graphic elements on a printer. EMF files are used to quickly record a printed document and return system control to a user. After control is returned to the user, the function calls stored in the EMF file may be accessed and sent to the printer in the background.

Files may be recorded for later play back by using a spool file that is written and later despooled to a printing device. Spool files may be used for EMF and raw files. However, a print job may also be written directly to a printing device without using a spool file. Some typical printing process scenarios using raw spool files and EMF spool files are described below to introduce the components, elements and relationships of these processes and how they relate to embodiments of the present invention. These scenarios are derived from information contained in the Microsoft Windows 95® Driver Development Kit (DDK) documentation, the Microsoft Windows 2000® DDK documentation and the Microsoft Windows NT® DDK documentation.

Figure 1:
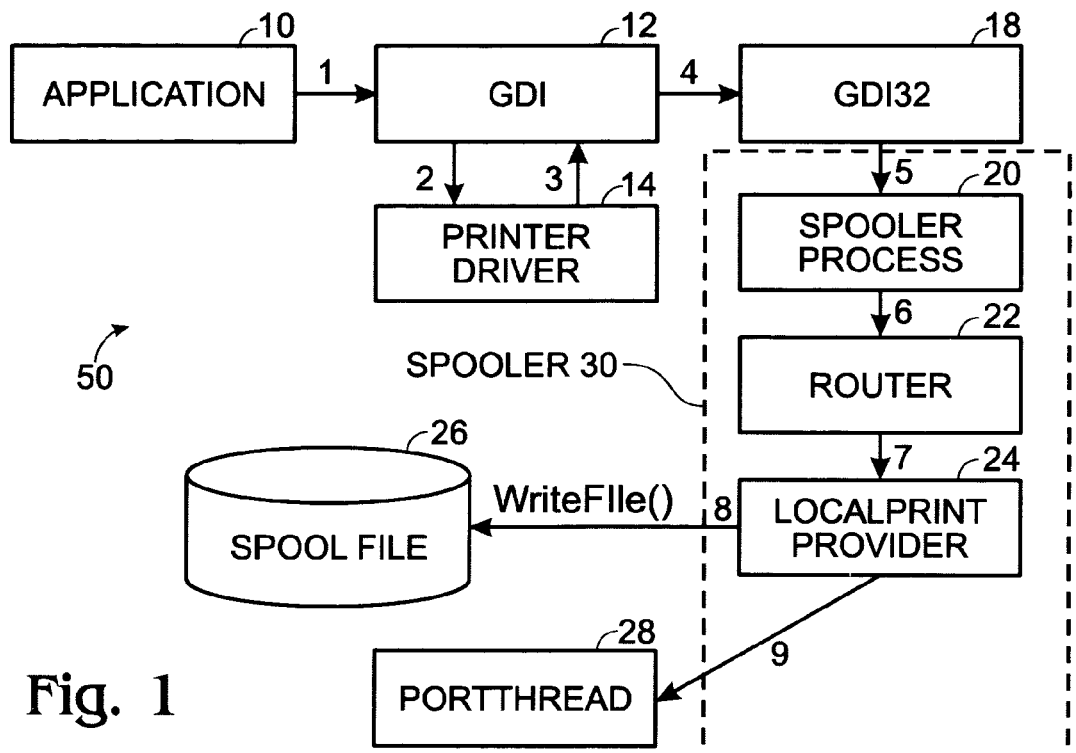
FIG. 1 is a diagram depicting a conventional printing operation using a raw spool file.

FIG. 1 is a diagram depicting a conventional printing operation using a raw spool file. Many of the above-mentioned components may be enabled as elements in a computer system 50. The computer system 50 may comprise any type of computing device, including a personal computer, workstation, personal digital assistant, or the like. The computer system 50 typically includes an operating system (not shown). The computer system 50 may run several applications. A single application, application 10 is shown. Examples of applications include word processors, spreadsheets, communication software, and presentation software. Typically, a user of the computer system may utilize application 10 to generate one or more documents. In some aspects, the computer system 50 may further comprise computer network components including other computing devices, servers, routers, hubs, switches and output devices such as displays, printers, plotters, CD writers, tape drives and other devices.

The computer system 50 may be connected to an output device such as a printer (not shown). The output device may be any type of output device that is capable of forming an image and that can be used in combination with the computer system 50. The printer may be used to print one or more documents created by the application 10.

As explained in more detail below, the computer system 50 may comprise an output system or print system for converting an application's output to a format compatible with an output device. An output system or print system may comprise a printer driver, print processor, spooler, print provider, as well as other print system components as described above in relation to Microsoft Windows operating systems. These print system components are software that enable the application 10 to communicate with a printer. When the application 10 needs to print a document, it sends print data to the print system. Print data is data describing the document to be printed. Typically, the print data is a series of commands (e.g., draw a circle, draw a line of text in a particular font, etc.). The printer system accepts the print data from the application 10 and then creates printer ready data. The printer ready data is print data translated into a format that a printer can understand. The format of the printer ready data may depend on the capabilities of the printer. For many low-end printers such as inkjets, the printer ready data is pixel data, i.e., data that may be used to print pixels on a piece of paper. More and more printers are capable of translating images presented in a variety of Printer Description Languages (PDLs), such as PCL (many versions) and PostScript.

An application 10 initiates a print request 1 by calling a graphic device interface (GDI) 12. Application 10 may be a word processor, spreadsheet, browser, database program, or some other program that runs on the underlying operating system. Typically, application 10 will create a device context (DC) and draw an object (i.e., a circle, a line, etc.) to the DC. The application 10 will then call the GDI with a print request directed to a particular printer 16 (FIG. 2) using that DC.

The GDI 12 will call the printer driver 14 associated with the particular printer 16 and request 2 instructions on how to render the object on that particular printer 16. The printer driver 14 will return 3 the instructions on how to render the object on the printer 16. In Windows 95®, used in this printing process example, the printer driver 14 is written in 16-bit code and communicates with a 16-bit GDI 12. This GDI will then pass the print request to a 32-bit GDI (GDI32) 18 to handle the 32-bit Windows 95® spooler process. GDI32 makes an interprocess call 5 to the spooler process 20.

Spooler process 20 calls 6 the router 22 to route the print job to printer 16. In this example, illustrated in FIGS. 1-2, the router 22 sends the print job to a local print provider 24. In other scenarios, the router 22 may send print jobs to a network printer through a network print provider (not shown). When the default Windows 95® spooler is used, network print jobs are spooled and despooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue. Rather, spooling and despooling are handled by the print spooler on the print server. This RPC method can be used in conjunction with Windows 95® spoolers also. Print jobs to locally connected printers or locally queued to (e.g., LPR) to network printers are handled similarly to Windows 95, 98 local print jobs.

In this local printing scenario, the router 22 calls the local print provider 24 with the print job. Local print provider 24 writes or "spools" 8 a raw spool file 26 to disk for later access. This is done to avoid waiting for the printer to complete the job before control is returned to the application. These steps from initiating the print request 1 to writing to spool file 26 may be repeated many times. Data may be appended to spool file 26 until an application signals that the print job is complete. The job completion may be signaled with an EndDoc function. Local print provider 24 also starts 9 a background thread 28 that will determine the best time to start playing back or "despooling" the spool file 26 to the printer 16.

Figure 2:
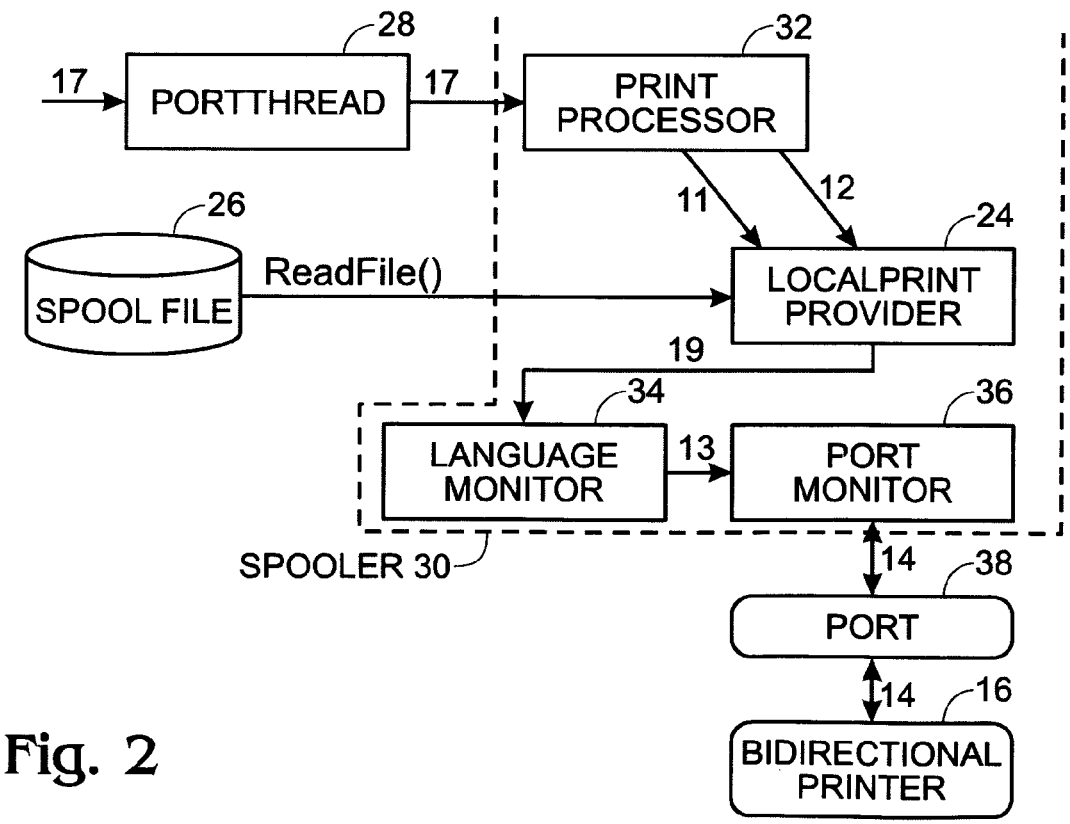
FIG. 2 is a diagram depicting a spooler subsystem.

FIG. 2 is a diagram depicting a spooler subsystem (prior art). Thread 28 monitors spooler subsystem resources to determine a good time to playback spool file 26. When thread 28 determines that playback should commence, a StartDoc function call 17 is sent to print processor 32 to start a new print processor thread 11. Print processor thread 11 invokes the local print provider 24 with a ReadPrinter function call to read part of the spool file 26. A print processor thread 19 also uses the local print provider 24 to invoke the language monitor 34 with a WritePrinter function call to send data through the physical port 38 connected with the bidirectional printer 16 specified previously.

For raw spool files, the default print processor 32 simply passes data through, without changing or interpreting any of the information. A language monitor 34 is used in this example because the destination printer 16 is a bidirectional printer. When non-bidirectional printers are used, a port monitor 36 is invoked instead of the language monitor 34. A language monitor 34 and port monitor 36 may be separate components or may be integrated into one monitor.

Language monitor 34 calls 13 a port monitor 36 to send print job data to the printer 16. The port monitor 36 then sends 15 the raw data through the physical port 38 to the printer 16. This process of reading from a spool file 26 and forwarding data to the printer 16 may be repeated several times to complete a print job. This is typically repeated until an end-of-file is reached or the job is cancelled. The playback thread 19 is terminated at that point. The combination of spooler process, router, local print provider, print processor, language monitor, and port monitor may be referred to collectively as a "spooler" 30.

Figure 3:
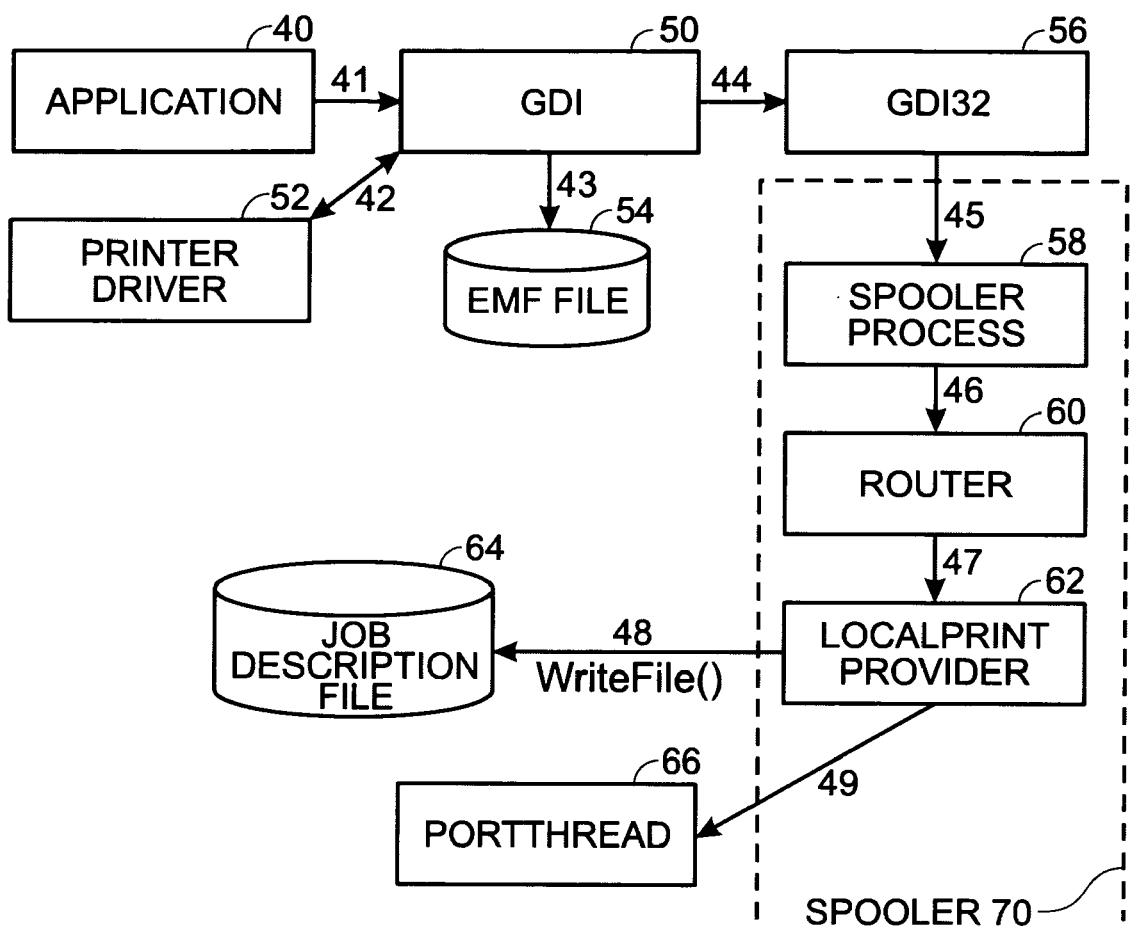
FIGS. 3 and 4 are diagrams illustrating Windows EMF printing operations.
Figure 4:
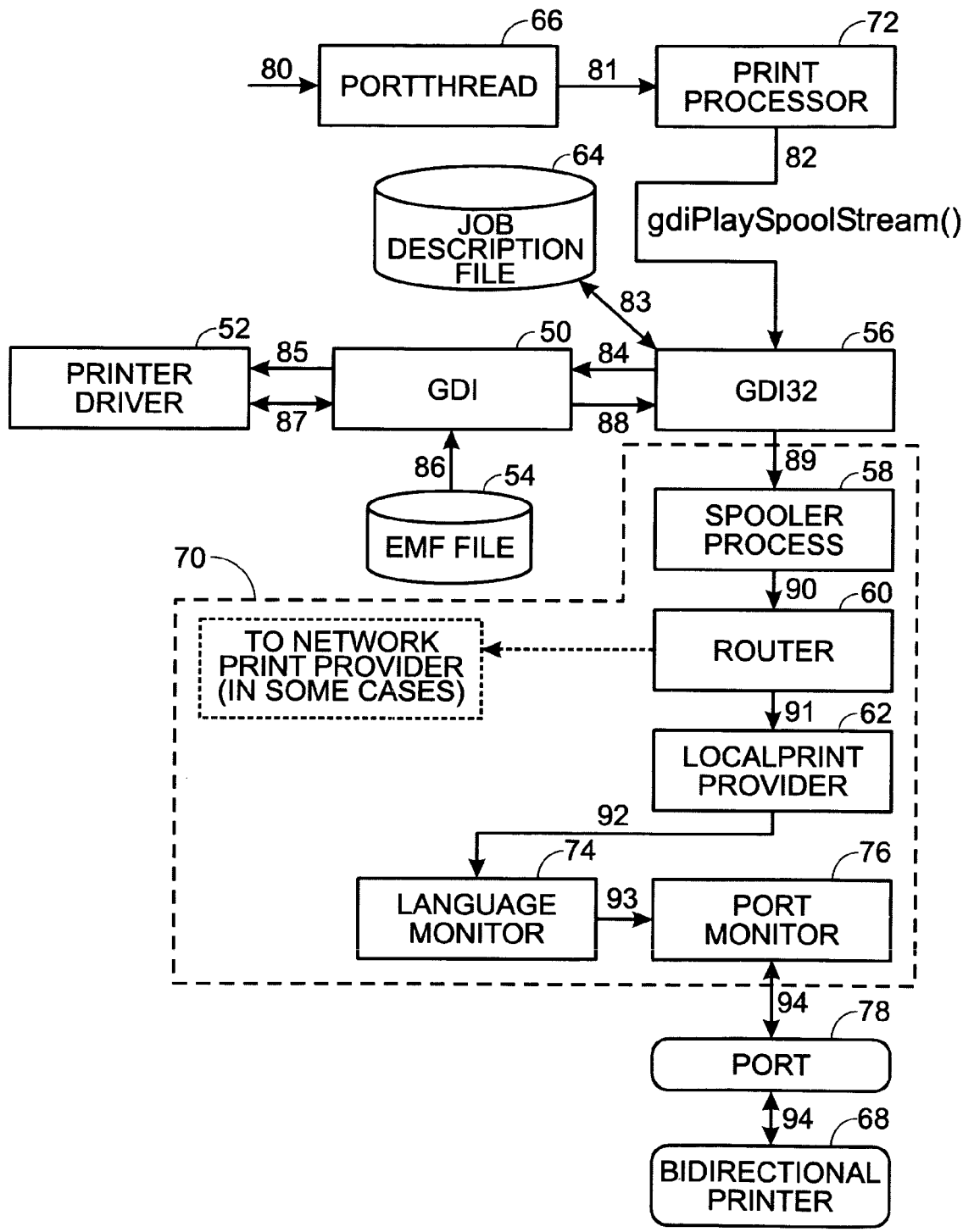

FIGS. 3 and 4 are diagrams illustrating Windows EMF printing operations (prior art). When Windows Enhanced Metafile (EMF) format files are used in the printing process of Windows 9.x systems, process components interact differently than with raw files. An example printing process, shown in FIGS. 3 and 4 illustrates the printing process using EMF files. This process typically commences when an application 40 creates a printer DC and draws an object to the DC (not shown). The application 40 then calls 41 GDI 50 with an EMF spooling request for a designated printer 68. GDI 50 queries 42 the printer driver 52 associated with the designated printer 68 to determine whether the driver 52 supports EMF spooling. If the driver 52 supports EMF spooling, GDI 50 changes the printer DC to an EMF DC and writes 43 the instructions for rendering the object to the EMF DC 54 (creates EMF files). GDI 50 then passes 44 the print request to the 32-bit GDI (GDI32) 56 because, in this example the Windows 95® spooler process is 32-bit code. GDI 32 subsequently makes an interprocess call 45 to the spooler subsystem 70 with a description of the print job.

The spooler process 58 (SPOOL32.EXE), in the spooler system 70, calls the router 60 to pass the print job description to the print provider 62 that can reach the designated printer 68. In this example, a local print provider 62 is used, but a network print provider may also be used. When the default Windows 95® spooler is used, network print jobs are spooled and despooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue. Rather, spooling and despooling are handled by the print spooler on the print server. This RPC method can be used in conjunction with Windows 95® spoolers also.

When the router 60 has called the print provider 62, the local print provider 62 creates 48 a job description file 64 and adds 48 a record to the job description file 64 each time it is called for the job until all the EMF page files have been spooled and each EMF file name and location is recorded in the job description file 64. When information about the last EMF file in the print job has been recorded, the local print provider 62 will call the spooler process 58 with an EndDoc function call. This signals the spooler process 58 that the complete job is spooled and ready for despooling. For multi-page jobs, these steps from initial spooling request 41 to job description file recording 48 are repeated for each page of a job.

When EMF file spooling is complete, the spooler process 58 sets a ReadyToPrint attribute on the print job and initiates an event 49 that signals to the port thread 66 that a job is available for printing. Port thread 66 responds to this event by determining the best time to start the despooling process and, at that time, loads 81 the print processor 72, as shown in FIG. 4. The print processor 72 will determine that the file format is EMF and call GDI32 56 with a Windows 95® function call 82.

GDI32 then invokes a gdiPlaySpoolStream function to read 83 from the job description file 64, which provides a fully qualified path to an EMF spool file 54. Through the job description file 64, which comprises a list of path names to EMF files, GDI32 knows about all the pages in the print job. The GDI32 gdiPlaySpoolStream function also calls GDI 50, using a thunk (a call across platform code) built into GDI32, with the path to the EMF spool file to render the page. GDI 50 only knows about one page in the print job at a time.

GDI 50 calls the printer driver 52 associated with the designated printer 68 chosen in application 40 and obtains a DC for the printer 68. GDI 50 then reads page-rendering instructions from the spooled EMF file 54 and passes 85 them one at a time to the printer driver 52 which uses as many instructions as are necessary to render the first part of the page. When the 16-bit printer driver 52 renders a part of the page, it passes 87 the printer-specific raw page data back to the GDI 50 which, in turn, passes 88 the raw data to GDI32 56. GDI32 56 then passes 89 the raw data to the spooler process 58 which then follows the same procedures it would for a raw format files as explained above.

Spooler process 58 calls 90 the router 60 to route the print job to printer 68. In this example, illustrated in FIGS. 3 and 4, the router 60 sends the print job to a local print provider 62. In other scenarios, the router 60 may send print jobs to a network printer through a network print provider (not shown). In this local printing scenario, the router 60 calls the local print provider 62 with the print job. Local print provider 62 invokes the language monitor 74 with a WritePrinter function call to send data through the physical port 78 connected with the bidirectional printer 68 specified previously.

A language monitor 74 is used in this example because the destination printer 68 is a bidirectional printer. When non-bidirectional printers are used a port monitor 76 would be invoked instead of the language monitor 74. A language monitor 74 and port monitor 76 may be separate components or may be integrated into one monitor. Language monitor 74 calls 93 a port monitor 76 to send print job data to the printer 68. The port monitor 76 then sends 94 the raw data through the physical port 78 to the printer 68.

Parts of EMF pages are processed in this manner and printed until an entire page is printed. GDI32 56 then gets the path to the EMF spool file for the next page and calls GDI 50 to use the instructions in that EMF file to render the next page of the print job. The print job is finished when all the paths to EMF spool files are used up.

Figure 5:
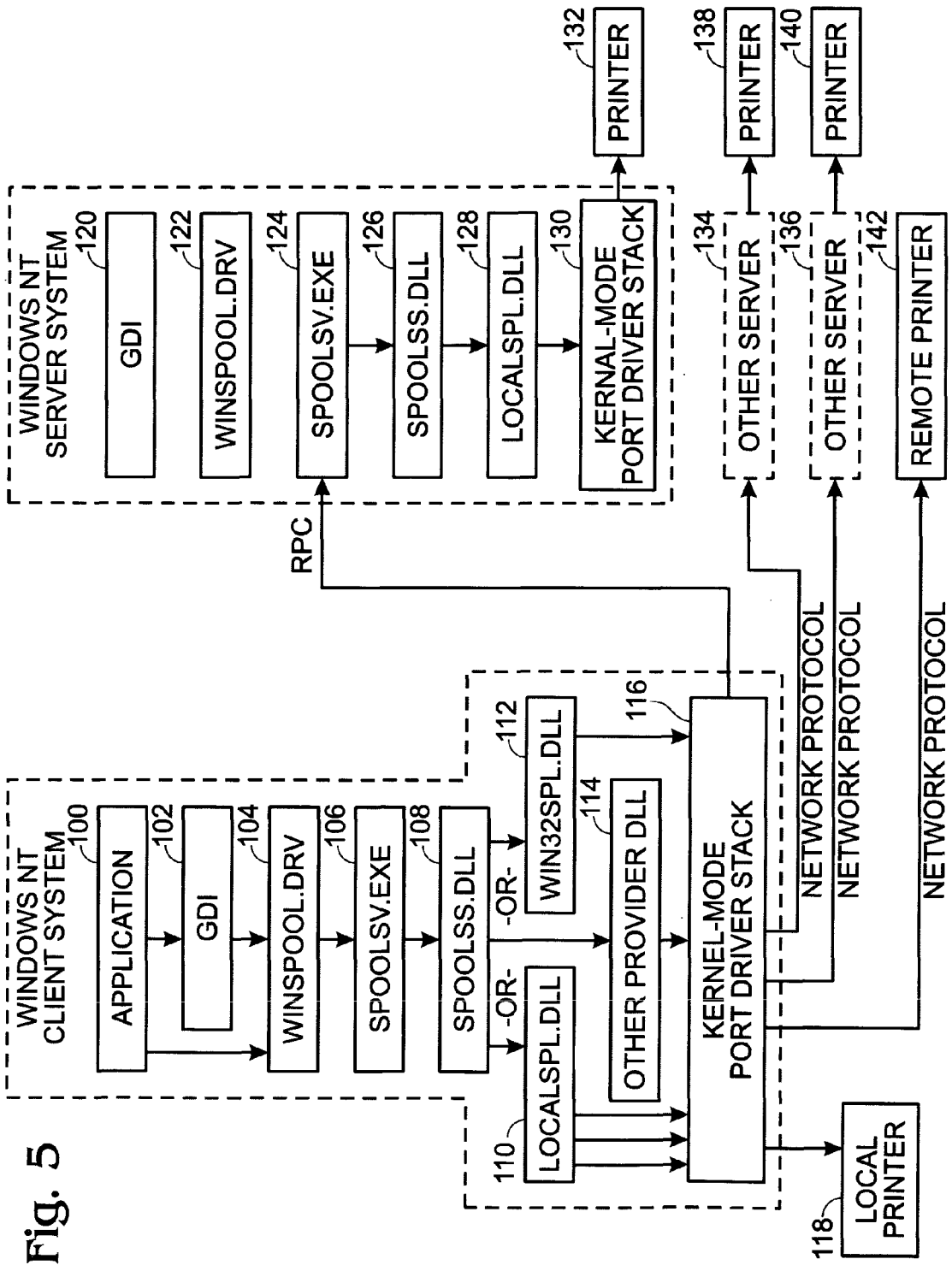
FIG. 5 is a diagram depicting Microsoft Windows NT and 2000 printing operations.

FIG. 5 is a diagram depicting Microsoft Windows NT and 2000 printing operations (prior art). Other versions of the Microsoft Windows operating systems, such as Windows NT and 2000 may use different printing processes. These processes may be used to print data to local, network, and remote printers either directly or through a network print server. EMF data may also be processed differently. For example, in Windows NT and 2000, the entire EMF data for all pages is passed to GdiPlayEMF( ) in one pass, rather than one page at a time. If the EMF data is to be queued on a print server, the EMF data is passed directly to the print server without rendering on the client. A mirror copy of the driver on the server renders the EMF data instead.

Typically, a user will employ an application 100 to create a print job by calling GDI 102 functions. The GDI 102 and/or application 100 will then call Winspool.drv 104, which is a client interface into the spooler. This client interface, Winspool.drv 104, exports the functions that make up the spooler's Win32® API and provides RPC stubs for accessing the server. The print job is then forwarded to the spooler's API server, Spoolsv.exe 106, which can be implemented as a Windows 2000 service that is started when the operating system is started. This API server module exports an RPC interface to the server side of the spooler's Win32® API. This module implements some API functions, but most function calls are passed to a print provider by means of the router, spoolss.dll 108.

The router 108 determines which print provider to call, based on a printer name or handle supplied with each function call, and passes the function call to the correct provider 110, 112 or 114. If the selected printer is managed by the client system, the print job is handled by the local print provider, localspl.dll 110. Printers managed by the local print provider 110 do not have to be physically local to the client, they may also be directly connected to network cards without using a server. When these printers are used, the print job is passed to the kernel-mode port driver stack 116 and on to the printer 118.

When printers located on a Windows NT/Windows 2000 server are selected, the router 108 directs the print job to the network print provider, Win32spl.dll 112. This network provider uses RPC to redirect calls from the client's router to the network server's spoolsv.exe process 124, which forwards the print job to the network server's router 126. Because the network printer is local to the print server system, the network server router 126 routes the job to the server's local print provider 128. The job is then directed to the server's kernel-mode port driver stack 130 and out to the selected network printer 132.

Remote printers may also be used with these systems. When a remote printer is selected, the client router 108 may direct the print job to the local print provider 110, which will forward the job to the kernel-mode port driver stack 116 and on to the remote printer 142 using a network protocol. When the local print provider 110 accesses a remote printer 142, the provider 110 uses a port monitor that can use network protocols recognized by the remote printer or its server.

Printers managed by non-Windows NT/2000 servers (e.g., Novell servers) may also be accessed through this print system. This may be achieved by using a local print provider 110 that directs the print job to the kernel-mode port driver stack 116 and on to the printer's server 136 using a type of network protocol. The server 136 then directs the job to the destination printer 140. This may also be achieved using a customized print provider 114 which sends the job to the kernel-mode port driver stack 116 which uses a network protocol to send the job on to the printer's server 134, which then directs the job to the destination printer 138.

Figure 6:
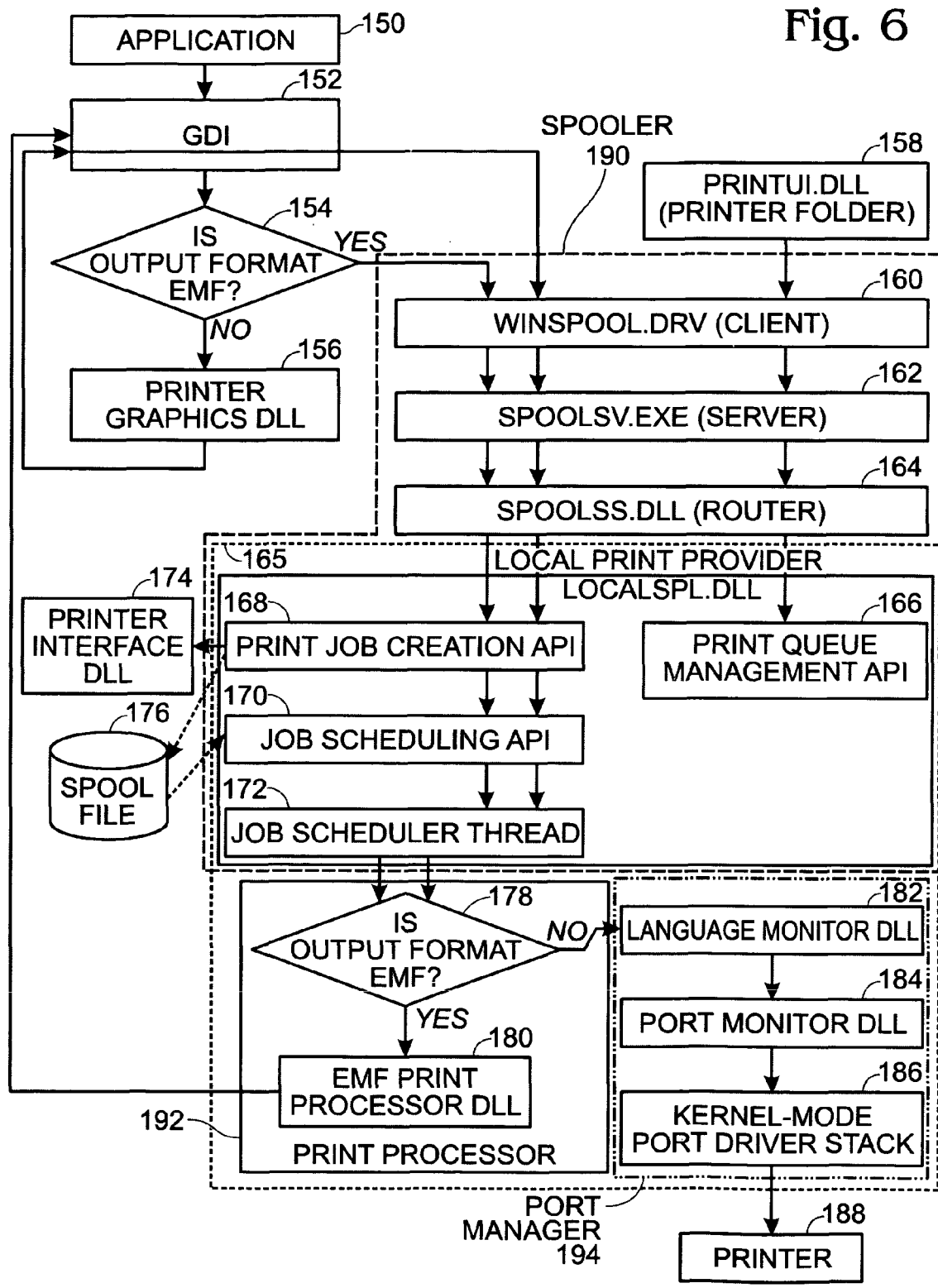
FIG. 6 is a diagram depicting a Windows 2000 print process.

FIG. 6 is a diagram depicting a Windows 2000 print process (prior art). In this process, an application 150 is used to create a print job with the Graphics Device Interface (GDI) 152. When the print job's initial output file is in raw format 154, the printer driver's printer graphics DLL 156 works in conjunction with the GDI 152 to create a print job that is sent to the client interface 160 of the spooler. Client interface 160 sends the job to the API server 162, which forwards the job to the router 164. In this example, the router 164 sends the job to the local print provider 165 as it is a local print job.

Within the local print provider 165, a print job creation API 168 is invoked. This API 168 accesses the printer driver's printer interface DLL 174 and creates a job spool file 176. The job creation API 168 also forwards job information to the job scheduling API 170, which initiates a job scheduler thread 172.

At this point, the file format is checked 178. If the initial job file is in a raw format already, the job is sent to the language monitor DLL 182 and on to the port monitor 184, which sends the job to the kernel-mode port driver stack 186. Port driver stack 186 sends the job to the selected printer 188 for final printing.

When an application 150 creates a print job with GDI 152 in EMF format, the job is sent 154 to a client spooler interface 160. Client interface 160 sends the job to the API server 162, which forwards the job to the router 164. Again, in this example, the router 164 sends the job to the local print provider 165 because the print job is local.

Within the local print provider 165, a print job creation API 168 is invoked. This API 168 accesses the printer driver's printer interface DLL 174 and creates a job spool file 176. The job creation API 168 also forwards job information to the job scheduling API 170, which initiates a job scheduler thread 172.

At this point, the file format is checked 178. If the initial job file is in EMF format, the job is sent to the print processor DLL 180, which directs the job back to GDI 152 for conversion to raw format with the help of printer interface DLL 174. The converted Job is then sent back through the spooler client interface 160, API server 162, and router 164 to the print provider 165. In the local print provider, the job is processed by the print job creation API 168, job scheduling API 170, and job scheduler thread 172. Because the job is now in raw format, the job is sent to the language monitor DLL 182 and on to the port monitor DLL 184 and kernel-mode port driver stack 186 before arriving at the destination printer 188.

Figure 8:
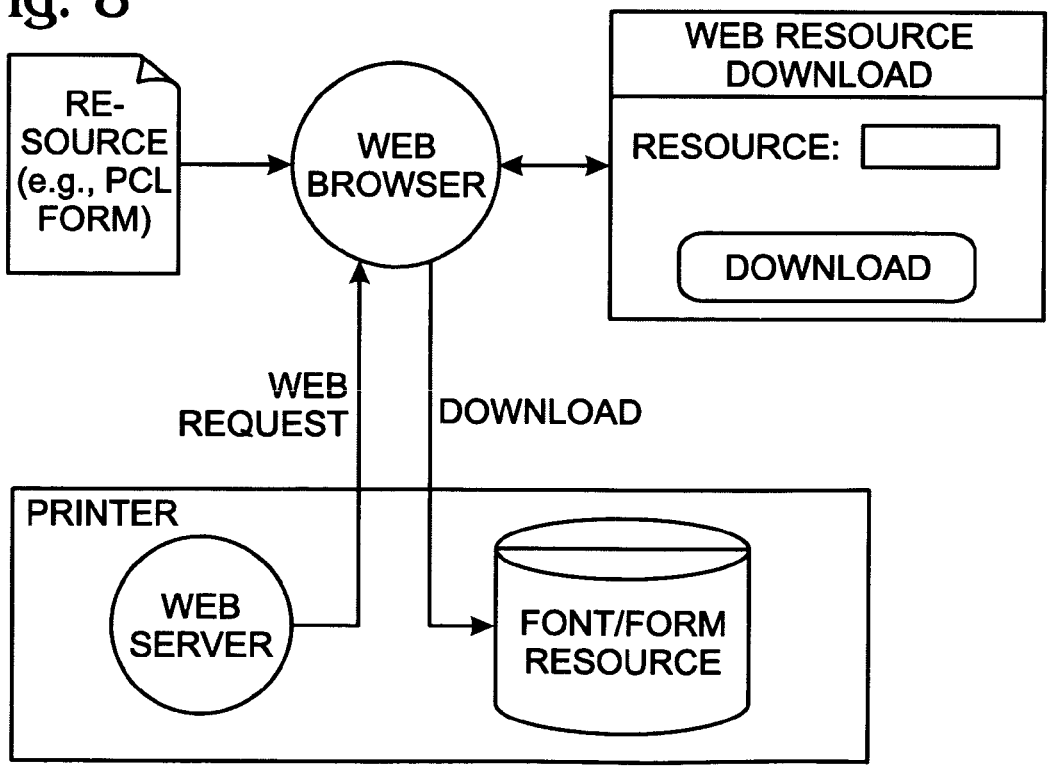
FIG. 8 is schematic block diagram of a system for downloading a software resource to a printer device.

FIG. 8 is schematic block diagram of a system for downloading a software resource to a printer device. For example, a user may begin the process by accessing a form/font/image/script download web page embedded in the MFP. From the web page, the user can browse to the location of the resource on their PC, and specify a location in MFP non-volatile or flash memory to download the resource. Once downloaded, subsequent print jobs can then reference these resources by referring to the name assigned to the resource in the MFP. However, there is nothing to prevent the MFP from "remembering" this location if a subsequent user attempts to process a job requiring the use of the downloaded resource. Thus, if the first user considers the resource to be private (not to be accessible to the general public), the first user must delete the downloaded resource after each use.

Figure 9:
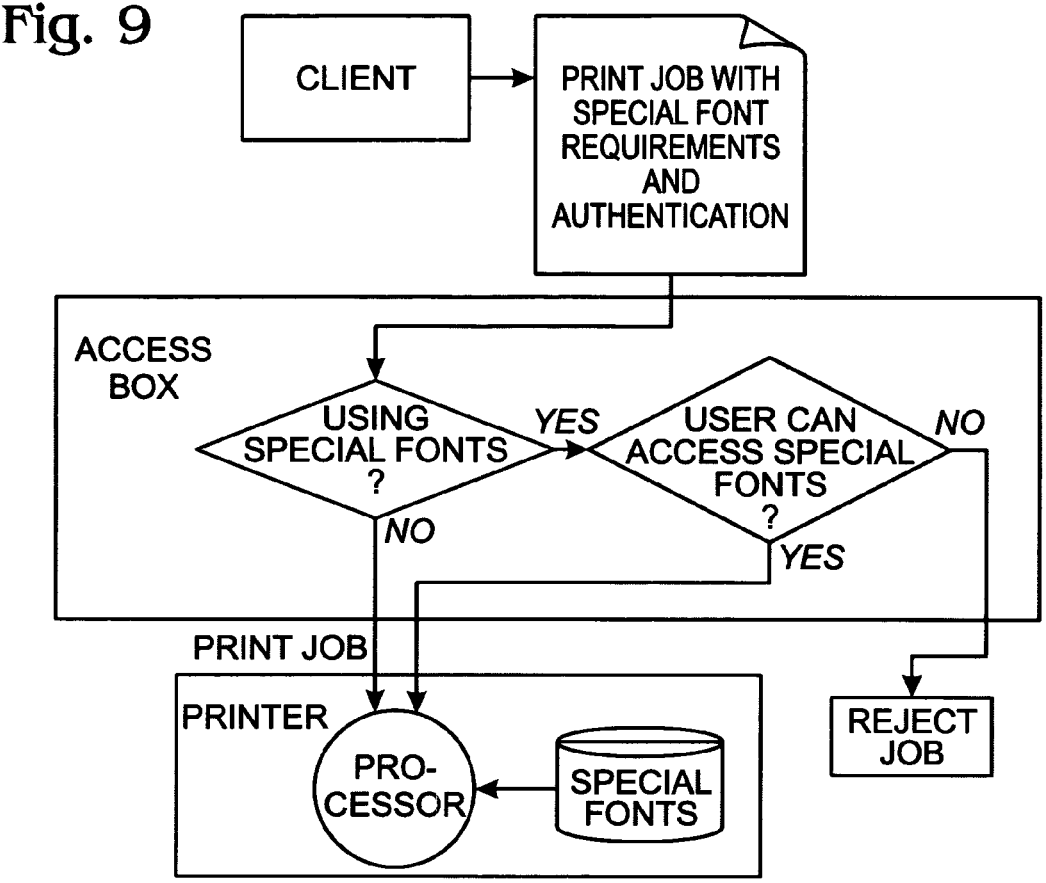
FIG. 9 is a schematic block diagram of a system that uses a security module to prevent the use of restricted resources in print job processing.

FIG. 9 is a schematic block diagram of a system that uses a security module to prevent the use of restricted resources in print job processing. For example, the printing device is loaded with a special font, whose access needs to be restricted. The printer is retrofitted with an access box connected between the print generation and the printer. The box is used to restrict access to the printer when a print job references the special font. In this case, when a print job is sent to the printer, it must first go through the box. The box then parses the job to determine if the job requires use of the special font. If not, the job is sent to the printer. Otherwise, the box determines if the job contains user authentication information. If not, the job is rejected. Otherwise, the user is authenticated and the box determines if the user has access rights to the special font. If the user does have access rights, the job is sent to the printer; otherwise, the job is rejected. However, this security process only applies to device resident resources (i.e., not downloaded resources). There is no means of identifying downloaded resources as restricted, and there is no means of defining user-specific access rights to a user's private resource.

Figure 10:
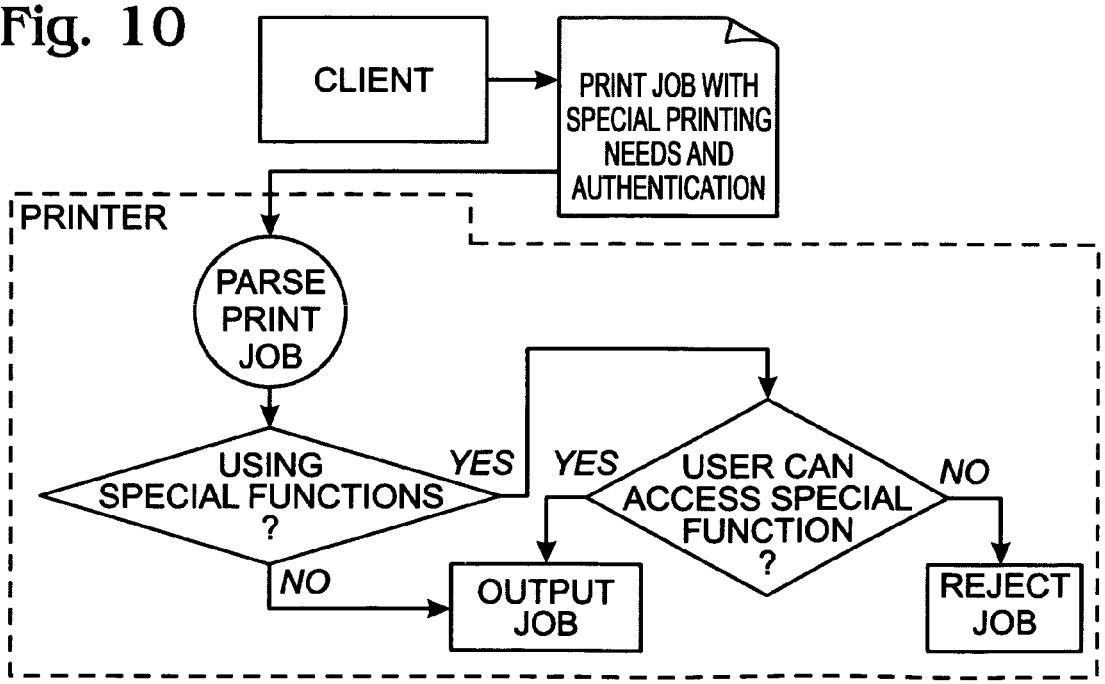
FIG. 10 is a schematic block diagram depicting a system that permits special users unlimited access to all restricted resources.

FIG. 10 is a schematic block diagram depicting a system that permits special users unlimited access to all restricted resources. In this method, access to the print unit and all special print functions (e.g., duplex, staple, paper type) can be granted after authenticating a user ID. When a print job is received by the printer, the printer parses the job to determine if the job requires any special functions, which have restricted access. If no special resources are needed, the job is printed. Otherwise, the printer determines if the job contains user authentication information. If special resources are required and user authentication has not been provided, the job is rejected. The authenticated user information is compared to a list of users who are permitted to access all restricted resources. If the user has access rights to all the required special functions, the job is printed. Otherwise, the job is rejected. However, this system does not provide a means of identifying private user resources that are downloaded. Neither does the system permit selective access to restricted resources on a user-by-user basis.

Figure 11:
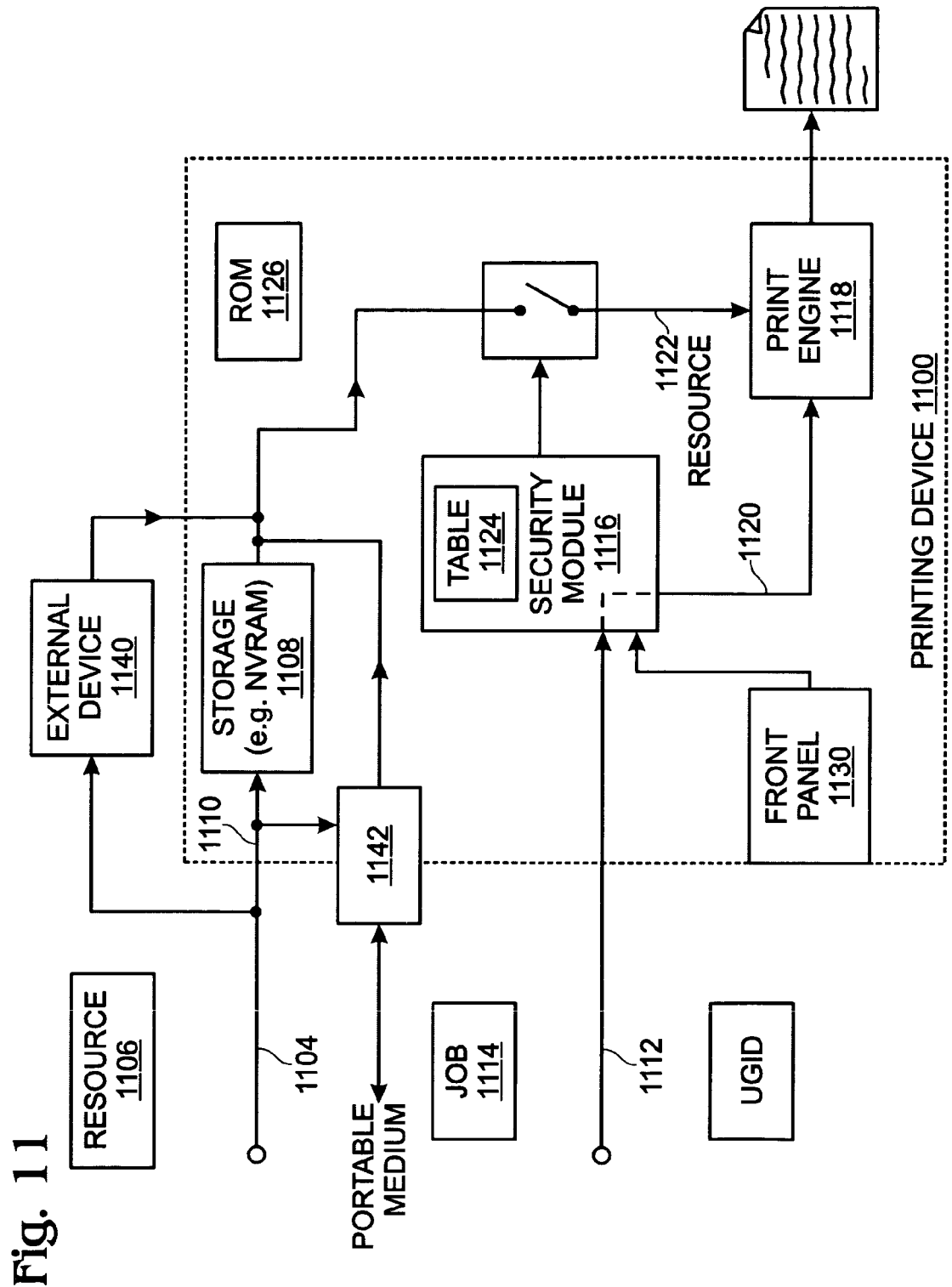
FIG. 11 is a schematic block diagram of a printing device with a system for securely accessing imaging job resources.

FIG. 11 is a schematic block diagram of a printing device 1100 with a system 1102 for securely accessing imaging job resources. The printing device 1100 may be a printer, MFP, facsimile device, filing device, format conversion device, publishing device, scanner, copier, electronic whiteboard, audio/video device, digital camera, or medical imaging device, to name a few examples. For simplicity, the end result of the process is depicted as a job printed on a physical medium. However, it should be understood that the invention is equally applicable to processes that convert electronic files.

The system 1102 comprises a first external port on line 1104 for downloading a restricted software resource represented by reference designator 1106. That is, the software resource 1106 is restricted for use by a user group. The first external interface on line 1104 may be a network connection, a local connection, or a portable storage medium, such as a disk drive or a memory stick interface, to name a few examples. Unlike factory-installed memory or field upgrades, where sections of software in memory are modified by replacing one or more ROM ICs, a download, as defined herein, involves the acceptance of the resource at an external port. From the external port, the information is transported via internal buses, with the cooperation of the microprocessor, to a location in memory. Alternately stated, factory-loaded resources are stored in designated ROM address ranges not writeable to the user. User-loaded resources may be stored in non-volatile storage address ranges that are 'allowed' by the system. In one aspect of the system, special 'tagging' may be preformed in the printing device to differentiate the downloaded and factory-loaded data. Further, internal tables can be created within the system that map the locations of the factory and user-loaded resources.

In addition, the implementation may use programmable flash devices with CPU-board socket locations to differentiate between factory and user-loaded resources. A configuration selection can be used to allow the user to define, by name, the resources which are 'protected' and which are 'open' for utilization.

A non-volatile storage (e.g. a non-volatile random access memory or NVRAM) 1108 is connected to the first external port on line 1110, for storing the restricted software resource. Alternately, the resource may be stored in a locally or network-connected external device 1140, or on a portable storage medium 11142, such as a floppy disk.

A second external port on line 1112 accepts an imaging job, represented by reference designator 1114, for processing. Note: although shown as separate interfaces, the imaging job and restricted resource may be received at a common interface, such as a LAN or WAN interface. For simplicity, the second external port 1112 may be understood as accepting a print job for processing in a format such as page description language (PDL), printer job language (PJL), a combination of PDL and PJL, or image formats such as TIFF, JPEG, and PNG. A print job is a document, image, or job in a printer-ready format prepared using a printer driver algorithm. Printer control language (PCL) is an example of PDL. Other examples include PCL5e, PCL5c, PCLXL, and enhanced metafile (EMF). However, this is not an exhaustive list. These languages describe the image and text to be printed.

For example, a print job uses fonts, watermarks, digital signatures, image stamps, and other elements needed to create printed output. Scanned documents or electronic files may also be imaging jobs, and by applying segmentation functions to these images, it is possible to separate and identify objects such as text, trademarks, etc. and create documents that are not image-based, such as a print job.

A security module 1116 permits access to the restricted software resource 1106 after verifying that the imaging job 1114 is associated with the user group. A print engine 1118 has an interface on line 1120 to accept the imaging job and an interface on line 1122 to access the access the memory in which the resource is stored (e.g., NVRAM 1108). The print engine 1118 processes the imagining job 1114 in response to accessing the restricted software resource 1106. For simplicity, the drawing assumes that all the processes associated with the imaging job are preformed in the print engine. For example, in this simplified representation the print engine can be said to incorporate raster image processing and generate the raster data necessary for creating an image on a physical medium such as paper. Therefore, the resources necessary for processing must be delivered to the print engine 1118.

Unlike factory installed programs, or field upgrades, which install software into read only memory (ROM) 1126, the downloaded resources 1106 are stored in memory which is accessible to a user, such as NVRAM 1108. That is, the memory is accessible because it can be written by a user. In one aspect, the security module 1116 differentiates the downloaded restricted software resource 1106 from factory-loaded resources stored ROM 1126.

Typically, the second external port 1112 also receives a user group identification (UGID) associated with the imaging job. The security module 1116 includes a table 1124 cross-referencing the restricted software resource in memory (e.g., NVRAM 1108, external memory 1140, or portable memory 1142) with a stored user group identification. The security module 1116 verifies that the imaging job is associated with the user group by matching the received user group identification to the stored user group identification. In one aspect, the second external port receives the user group identification simultaneously with accepting the imaging job for processing. That is, the UGID is received in the same message, or same set of messages as the job. For example, the UGID may be PJL statements accompanying the imaging job.

In a different aspect, the UGID is received after the imaging job. The security module 1116 determines that the restricted software resource 1106 is required for processing, and generates a user group identification request supplied at an external port. In response to the request, the user group identification is received at the external port in response. In one aspect, the UGID request and UGID request are transceived on the same port as the imaging job. Alternately, the UGID request/response may be made via a different interface. In one aspect, the UGID request/response are transceived via a printer device front panel 1130.

In one aspect, the security module 1116 receives a user group identification such as a PIN number, a one-way hash number, a combination user ID and password, a magnetic card, or a smartcard. However, the ID could also be biometric. The identification means is not limited to any particular method. The identification can be delivered the front panel 1130, or via a local or network connection (e.g., line 1112).

In one aspect, the user authentication needed to access a resource may be selected. For example, the first (or second) external port may receive user authorization criteria required to access the downloaded resource, and the NVRAM 1108, or some other accessible memory stores the user authorization criteria. Then, when a resource is requested, the security module accesses the memory to determine the authorization requirements.

The software resource may be any component that aids in the processing of an imagine job or print job. Some examples of software resources that a user group may seek to restrict include forms, fonts, macros, logos, watermarks, address books, halftone patterns, color profiles, cover sheets, image stamp, calibration data, digital signatures, biometric information, audio/video clips, and dictionaries. The above-mentioned list of resources is not exhaustive.

In one aspect, a user can control the restrictions that are applied to a resource. For example, the first (or second) external interface may accept a set of restrictions, in any format, to be applied to the downloaded resource. The set of restrictions are stored in a memory, such as NVRAM 1108. When a resource is requested, the security module can access the NVRAM to determine the restrictions to be applied to that resource.

Functional Description

An exemplary operating environment for downloaded resource accessing system includes a network, locally or remotely connected to a printing or multifunctional peripheral device (MFP). Specific examples of printing devices include a stand-alone printer, facsimile device, scanner, electronic whiteboard, or copier, all of which are capable of producing a hard-copy result. However, the invention is also applicable to devices that manipulate an image or electronic file, such as a filing device, which may store a rasterized image for later reprinting. A printing device may be a device that performs format conversion, audio/video devices, document management, such as document archive/retrieval, manipulation and transfer, spectrum generation and analysis, sonar, digital cameras, and medical imaging, such as X-Ray, MRI, and CAT-Scan devices.

The printing device has the capability of storing reusable (software) resources temporarily, semi-permanently, or permanently. Examples of reusable resources include forms, fonts, macros, logos, watermarks, address books, image stamps, half-tone patterns, color profiles, cover sheets, calibration data, digital signatures, biometric information, audio/video clips, and dictionaries.

For example, a print job might reference using a variable data form that has been downloaded and stored in the device for multiple reuse. In another example, a scan job might reference a copyright watermark, which is to be embedded in the scanned image data, that has been downloaded and stored in the device for multiple reuse. Additionally, when the user generates an imaging job request (outbound or inbound), either on the connected client or printing device, the user can authenticate themselves. The authentication is then associated with the job.

Some examples of authentication include a PIN number, where a PIN may range from a simple combination of characters, to a one-way hashed code, such as MD5. The authentication can be the combination of a user ID and password, a biometric, magnetic card, public/private key encryption (e.g., RSA or AES), or Smartcard, to name a few examples.

The present invention system permits a user or administrator to download one or more reusable resources to a printing device, where the resource has an authentication requirement to be subsequently accessed. The resource can be downloaded into the device via a local connection (wired or wireless), using a serial, USB, parallel, or IrDA interface, for example. Alternately, a network connection (wired or wireless) may be used, such as TCP/IP or AppleTalk.

The download may occur either as a walkup operation at the device, or remotely from another connected device. The resource to download may be local on the host from which the download occurs, or external, such as on the Internet or on another connected device, or from a storage media, such as a CD, floppy, or memory stick. In some aspects, the resource data may be compressed before downloading to the device, such as using run-length, LZW, delta-row, G3, or G4 methods of compression.

One example method of downloading a resource is to use the HP PJL file system control commands. One example of the file download command is (@PJL FSDOWNLOAD FORMAT:BINARY . . . ), which may be as follows:

```
@PJL FSDOWNLOAD FORMAT:BINARY=<size>
NAME="<resource name>"
<resource data>
<Esc>%-12345X
```

In another example, the resource might be downloaded using the PCL font permanent download control commands: <Esc>*c5F.

Once the resource is downloaded, it may be stored anywhere that is accessible by the device, such as internal to the device (e.g., hard-drive, flash, or RAM). Alternately, the resource may be loaded external to the printing device with offline storage (e.g., a storage server), removable storage (e.g., CD, floppy, memory stick, removable HD), or in an Internet-connected location. In one aspect, the printing device needs to go to some external device, which acts as 'authority', in order the get the requested resource.

As part of the download of a resource that requires an authenticated access to use, the user can specify the access rights and/or authentication method. For example, the user may specify that access to reusing the resource be limited to one particular user or a group of users. The user/administrator may specify any means for authentication to access the resource. Access to the resource may be open to all users, but restricted in the number of times the resource can be accessed, the type of job in which the resource may be used, the time of day, or the content of the job, to name a few possibilities.

Figure 12:
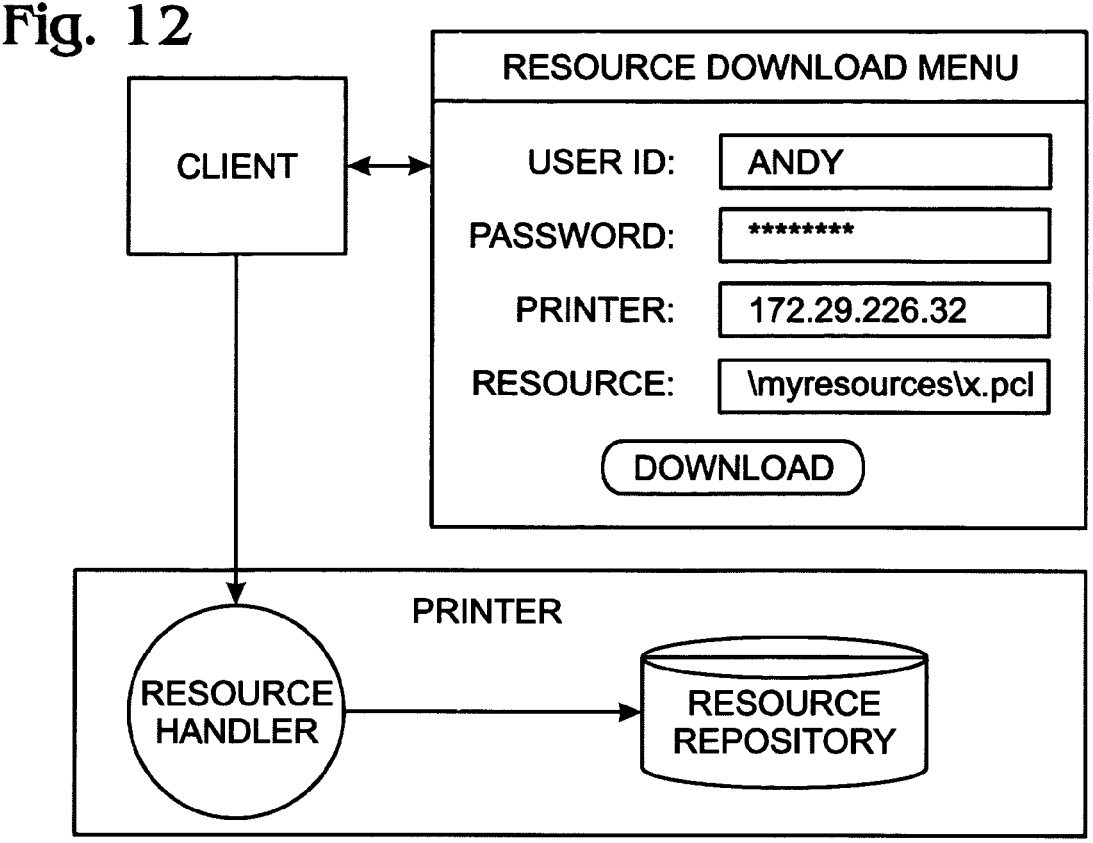
FIG. 12 is a schematic block diagram depicting the process of selecting the restrictions that are applied to a downloaded resource.

FIG. 12 is a schematic block diagram depicting the process of selecting the restrictions that are applied to a downloaded resource. The authentication/access rights restrictions are downloaded with the resource to the printing device, and stored with the resource. The process of downloading a resource may itself be restricted, limited to certain authenticated users, the number of resources, the type of resource, or the size of the resource.

Figure 13:
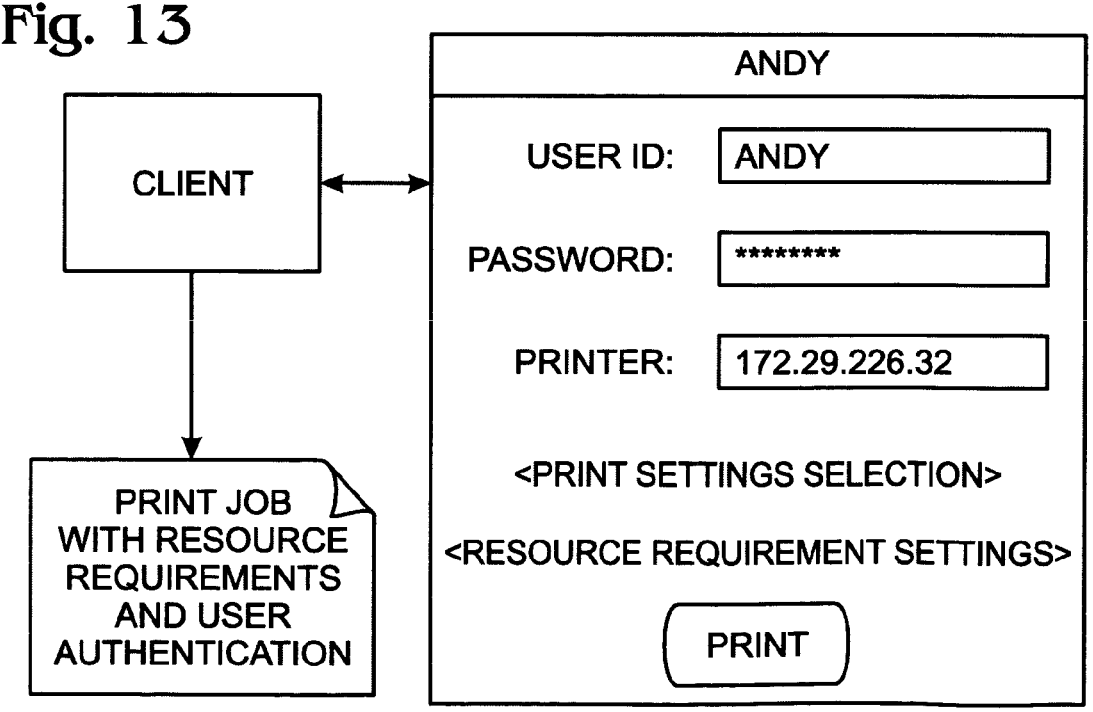
FIG. 13 is a schematic block diagram depicting the process of submitting authentication and selecting a resource, while generating a job.

FIG. 13 is a schematic block diagram depicting the process of submitting authentication and selecting a resource, while generating a job. Once the resource(s) have been downloaded to the printing device, a user(s) may generate a job that requires access to the downloaded resource. In this case, the user may perform the following additional steps when generating a job (e.g. a print, fax, file, or scan job). First, information is entered to authenticate the user. Then, one or more of the downloaded resources is identified, which is required to process the job. Thus, the generated job contains the information to authenticate the user and the required resources.

For a print job, authentication may be accomplished by passing the user's network user ID and password as PJL commands. Additionally, the user's password may be protected by encryption, such as using a one-way hash (e.g., MD5). For a copy job, the user may be authenticated by swiping a magcard or smartcard.

Figure 14:
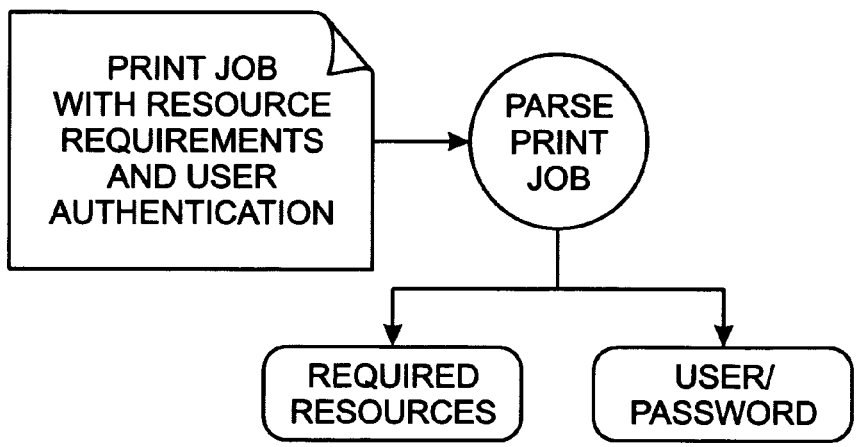
FIG. 14 is a schematic block diagram depicting the process of parsing a submitted job.

FIG. 14 is a schematic block diagram depicting the process of parsing a submitted job. When the printing device receives a job, the job information is parsed to determine if the job requires any resources that are not embedded in the job.

Figure 15:
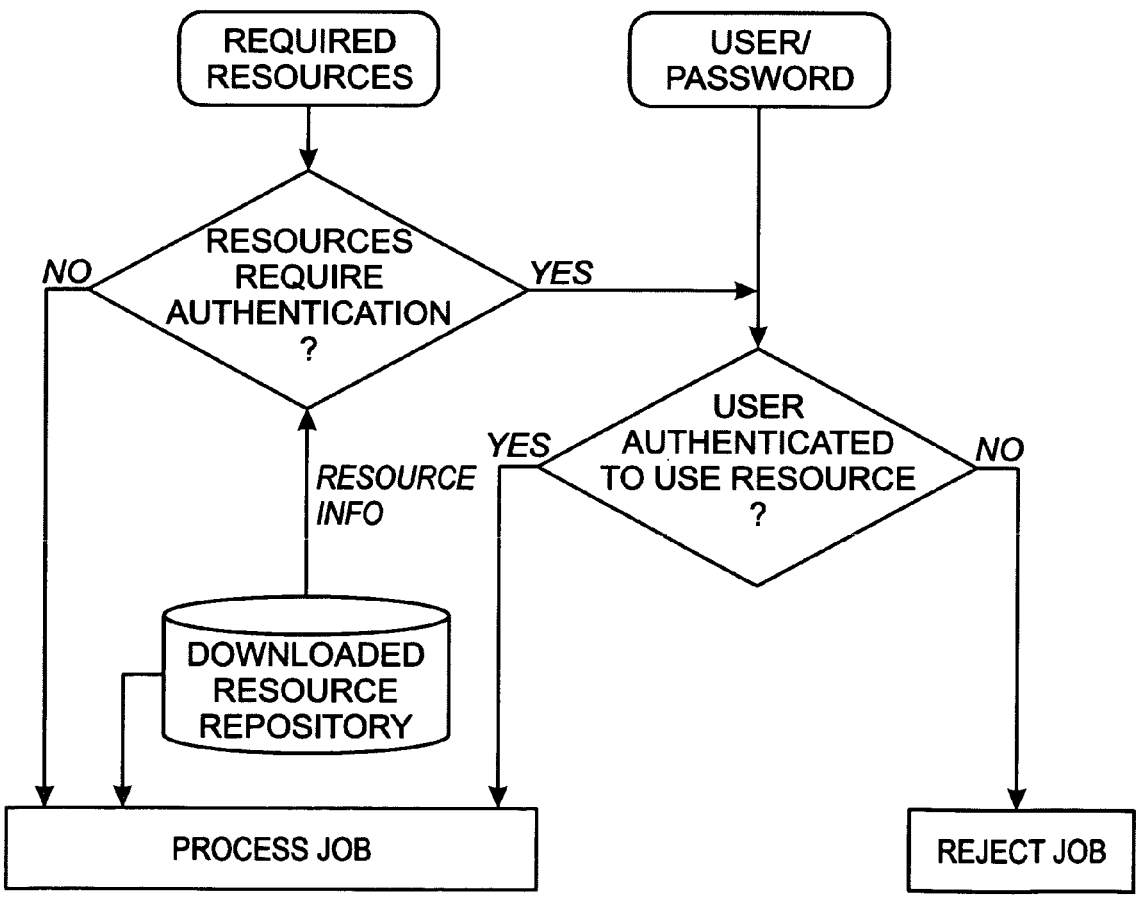
FIG. 15 is a flowchart illustrating a process of authenticating user identity and accessing restricted resources.

FIG. 15 is a flowchart illustrating a process of authenticating user identity and accessing restricted resources. If the job does not contain any non-embedded resource requirements, the job is then processed. Otherwise, the printing device determines if any of the required resources require authentication. Typically, this is done by looking up the resource in the stored resource repository, and obtaining authentication/access control information back. If none of the resources require authentication, the job is then processed. If one or more of the resources do require authentication, the printing device checks if the job contains authentication information. The authentication information may be embedded as job control commands (e.g., PJL commands), or it may be entered separately, such as at the front panel or by a card swipe.

If the job does not contain information to authenticate the user, the job is rejected. Otherwise, the authentication information is compared to the authenticated user/access rights of each required resource. If the authentication information meets the authentication/access rights of each resource, the job is processed; otherwise the job is rejected.

The print subsystems of the client devices may be based upon Microsoft Windows Operating Systems, Apple MacIntosh Operating Systems, Linux Operating System, System V Unix Operating Systems, BSD Unix Operating Systems, OSF Unix Operating Systems, Sun Solaris Operating Systems, HP/UX Operating Systems, and IBM Mainframe MVS Operating System. However, the invention is not limited to any particular operating system.

FIG. 16 is a flowchart illustrating a method for securely accessing imaging job resources in a printing device. The printing device may be a printer, facsimile device, filing device, format conversion device, publishing device, scanner, copier, electronic whiteboard, audio/video device, digital camera, or medical imaging device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1600.

Step 1602 downloads a restricted software resource to a printing device. The resource's use is restricted for use to a particular user group. Step 1604 stores the restricted software resource in a memory, such as (internal) non-volatile storage, locally or network-connected external memory, or portable storage medium. Step 1606 accepts an imaging job for processing. In one aspect, accepting the imaging job for processing in Step 1606 includes accepting a print job in a page description language (PDL), printer job language (PJL), a combination of PDL and PJL, or image format, such as TIFF, JPEG, or PNG. Step 1608 verifies that the imaging job is associated with the user group. Subsequent to verification, Step 1610 permits access to the restricted software resource. Step 1612 processes the imagining job using the restricted software resource.

In one aspect, storing the restricted software resource in storage (Step 1604) includes cross-referencing the resource in memory with a stored user group identification. Then, verifying that the imaging job is associated with the user group in Step 1608 includes substeps. Step 1608a receives a user group identification, and Step 1608b matches the received user group identification to the stored user group identification.

In another aspect, receiving the user group identification (Step 1608a) includes receiving the user group identification simultaneously with accepting the imaging job for processing Step 1606. Alternately, receiving the user group identification in Step 1608a includes additional substeps. In response to accepting the imaging job, Step 1608a1 determines that the restricted software resource is required for processing. Step 1608a2 generates a user group identification request. Step 1608a3 receives the user group identification in response to the request.

The user group identification received in Step 1608a may be a PIN number, a one-way hash number, a combination user ID and password, a magnetic card, or a smartcard. However, the invention is not limited to any particular type of identification.

In one aspect, downloading the restricted software resource in Step 1602 includes downloading the resource using a communication medium such as a local connection, network connection, or portable storage medium. Some examples of the resources that can be downloaded include forms, fonts, macros, logos, watermarks, address books, halftone patterns, color profiles, image stamps, cover sheets, calibration data, digital signatures, biometric information, audio/video clips, and dictionaries.

In another aspect, Step 1607a accepts user authorization criteria required to access the downloaded resource, and Step 1607b stores the user authorization criteria. Alternately, or in addition, Step 1607c accepts a set of restrictions to be applied to the downloaded resource, and Step 1607d stores the set of restrictions.

In one aspect, the method performs a further step. Subsequent to downloading the restricted software resource in Step 1602, Step 1603 differentiates the downloaded resource from factory-loaded resources stored in read only memory (ROM).

A system and method have been provided for securing access to downloaded software resources in a printing device. Examples of specific formats and protocols have been given to illustrate the invention. Likewise, examples of specific resource types, restriction types, and authorization types have been given. However, the invention is not limited to merely these examples. Other variations and embodiments of the invention will occur to those skilled in the art.

We claim:

1. In a printing device, a method for securely accessing imaging job resources, the method comprising:
    downloading a restricted software resource to a printing device;
    storing the restricted software resource in a memory;
    permitting general public access to the restricted software resource, subject to a limited access condition selected from a group consisting of the number of times the restricted software resource may be used, the type of imaging job, the time of day, and the content of an imaging job;
    accepting an imaging job for processing;
    verifying that the imaging job is subject to a limited access condition, but associated with a user group having restricted software resource authorization that permits unlimited access to the restricted software resource;
    subsequent to verification of the user group, permitting unlimited access to the restricted software resource; and,
    processing the imagining job using the restricted software resource.

2. The method of claim 1 wherein storing the restricted software resource in the memory includes cross-referencing the resource in memory with a stored user group identification; and,
    wherein verifying that the imaging job is associated with the user group includes:
        receiving a user group identification; and,
        matching the received user group identification to the stored user group identification.

3. The method of claim 2 wherein receiving the user group identification includes receiving the user group identification simultaneously with accepting the imaging job for processing.

4. The method of claim 2 wherein receiving the user group identification includes:
    generating a user group identification request; and,
    receiving the user group identification in response to the request.

5. The method of claim 2 wherein receiving the user group identification includes receiving an identification selected from a group consisting of a PIN number, a one-way hash number, a combination user ID and password, a magnetic card, and a smartcard.

6. The method of claim 1 wherein downloading the restricted software resource includes downloading the resource using a communication medium selected from a group consisting of a local connection, network connection, and portable storage medium.

7. The method of claim 1 further comprising:
    accepting user authorization criteria required to access the downloaded resource; and,
    storing the user authorization criteria.

8. The method of claim 1 wherein downloading the restricted software resource includes downloading a resource selected from a group consisting of forms, fonts, macros, logos, watermarks, address books, halftone patterns, image stamps, color profiles, cover sheets, calibration data, digital signature, biometric information, audio/video clips, and dictionaries.

9. The method of claim 1 wherein downloading restricted software resources to the printing device includes downloading to a printing device selected from a group consisting of a printer, facsimile device, filing device, format conversion device, publishing device, scanner, copier, electronic whiteboard, audio/video device, digital camera, and medical imaging device.

10. The method of claim 1 wherein accepting the imaging job for processing includes accepting a print job in a format selected from a group consisting of page description language (PDL), printer job language (PJL), and image format.

11. The method of claim 1 further comprising:
    subsequent to downloading the restricted software resource, differentiating the downloaded resource from factory-loaded resources stored in read only memory (ROM).

12. The method of claim 1 further comprising:
    accepting a set of limited access conditions to be applied to the downloaded resource; and,
    storing the set of limited access conditions.

13. The method of claim 1 wherein storing the restricted software resource in the memory includes storing the resource in a memory selected from a group consisting of an internal memory, locally-connected memory, network-connected memory, and portable storage medium.

14. In a printing device, a system for securely accessing imaging job resources, the system comprising:
    a first external port for downloading a restricted software resource;
    a memory connected to the first external port, for storing the restricted software resource;
    a second external port for accepting an imaging job for processing;
    a security module permitting general public access to the restricted software resource, subject to a limited access condition selected from a group consisting of the number of times the restricted software resource may be used, the type of aging job, the time of day, and the content of an imaging job, but the security module permitting unlimited access to the restricted software resource regardless of a limited access condition, after verifying that the imaging job is associated with a user group having restricted software resource authorization; and, a print engine having an interface to accept the imaging job and to access the memory, the print engine processing the imaging job in response to accessing the restricted software resource.

15. The system of claim 14 wherein the second external port receives a user group identification associated with the imaging job; and, wherein the security module includes a table cross-referencing the restricted software resource in memory with a stored user group identification, the security module verifying that the imaging job is associated with the user group by matching the received user group identification to the stored user group identification.

16. The system of claim 15 wherein the second external port receives the user group identification simultaneously with accepting the imaging job for processing.

17. The system of claim 15 wherein the security module determines that the restricted software resource is required for processing, generates a user group identification request supplied at an external port, and receives the user group identification at the external port in response to the request.

18. The system of claim 15 wherein the security module receives a user group identification selected from a group consisting of a PIN number, a one-way hash number, a combination user ID and password, a magnetic card, and a smartcard.

19. The system of claim 14 wherein the first external port is a communication medium selected from a group consisting of a local connection, network connection, and portable storage medium.

20. The system of claim 14 wherein the first external port receives user authorization criteria required to access the downloaded resource; and, wherein the memory stores the user authorization criteria.

21. The system of claim 14 wherein the first external medium downloads a restricted software resource selected from a group consisting of forms, fonts, macros, logos, watermarks, address books, halftone patterns, image stamps, color profiles, cover sheets, calibration data, digital signatures, biometric information, audio/video clips, and dictionaries.

22. The system of claim 14 wherein the printing device is a device selected from a group consisting of a printer, facsimile device, filing device, format conversion device, publishing device, scanner, copier, electronic whiteboard, audio/video device, digital camera, and medical imaging device.

23. The system of claim 14 wherein the second external port accepts a print job for processing in a format selected from a group consisting of page description language (PDL), printer job language (PJL), and image format.

24. The system of claim 14 wherein the security module differentiates the downloaded restricted software resource from factory-loaded resources stored in read only memory (ROM).

25. The system of claim 14 wherein the first external interface accepts a set of limited access conditions to be applied to the downloaded resource; and, wherein the memory stores the set of limited access conditions.

26. The system of claim 25 wherein the memory is selected from a group consisting of an internal memory, locally-connected memory, network-connected memory, and portable storage medium.

27. In a printing device, a method for securely accessing imaging job resources, the method comprising:

downloading a restricted software resource to a printing device;

storing the restricted software resource in a memory;

permitting general public access to the restricted software resource subject to a limited access condition;

accepting an imaging job for processing;

verifying that the imaging job is subject to a limited access condition, but associated with a user group having restricted software resource authorization that permits unlimited access to the restricted software resource;

subsequent to verification of the user group, permitting unlimited access to the restricted software resource; and, processing the imagining job using the restricted software resource.

* * * * *

UNITED STATES PATENT AND TRADEMARK OFFICE
CERTIFICATE OF CORRECTION

PATENT NO. : 8,120,802 B2  Page 1 of 1
APPLICATION NO. : 11/634665
DATED : February 21, 2012
INVENTOR(S) : Roy Chrisop et al.

It is certified that error appears in the above-identified patent and that said Letters Patent is hereby corrected as shown below:

In column 17, line 1 (claim 14), the word "imaging" has been incorrectly printed as "aging".

Claim 14 should be printed as follows:

14. In a printing device, a system for securely accessing imaging job resources, the system comprising:
    a first external port for downloading a restricted software resource;
    a memory connected to the first external port, for storing the restricted software resource;
    a second external port for accepting an imaging job for processing;
    a security module permitting general public access to the restricted software resource, subject to a limited access condition selected from a group consisting of the number of times the restricted software resource may be used, the type of imaging job, the time of day, and the content of an imaging job, but the security module permitting unlimited access to the restricted software resource regardless of a limited access condition, after verifying that the imaging job is associated with a user group having restricted software resource authorization; and,
    a print engine having an interface to accept the imaging job and to access the memory, the print engine processing the imaging job in response to accessing the restricted software resource.

Signed and Sealed this
Twenty-fifth Day of September, 2012

David J. Kappos
*Director of the United States Patent and Trademark Office*